United States Patent [19]

Niwa

[11] 4,211,908
[45] Jul. 8, 1980

[54] APPARATUS FOR HIGH FREQUENCY DISCHARGE SHAPING OF A WORKPIECE BY MEANS OF A RECTANGULAR BIPOLAR PULSATING VOLTAGE

[75] Inventor: Yoshiei Niwa, Yokohama, Japan

[73] Assignee: Mitsubishi Denki Kabushiki Kaisha, Tokyo, Japan

[21] Appl. No.: 766,347

[22] Filed: Feb. 7, 1977

Related U.S. Application Data

[63] Continuation of Ser. No. 548,019, Feb. 7, 1975, abandoned.

[30] Foreign Application Priority Data

| Feb. 19, 1974 | [JP] | Japan | 49-19130 |
| Feb. 19, 1974 | [JP] | Japan | 49-19131 |
| Feb. 19, 1974 | [JP] | Japan | 49-19132 |
| Feb. 19, 1974 | [JP] | Japan | 49-19133 |
| Feb. 19, 1974 | [JP] | Japan | 49-19134 |
| Mar. 6, 1974 | [JP] | Japan | 49-25309 |

[51] Int. Cl.² ............................................. B23P 1/08
[52] U.S. Cl. .................................. 219/69 P; 219/69 C
[58] Field of Search ............ 219/69 P, 69 M, 69 C, 219/69 D, 69 R, 68

[56] References Cited

U.S. PATENT DOCUMENTS

| 2,785,279 | 3/1957 | Williams | 219/69 D |
| 2,951,930 | 9/1960 | McKechnie | 219/69 C |
| 3,014,155 | 12/1961 | Inoue | 219/69 C |
| 3,115,568 | 12/1963 | Blackman et al. | 219/69 P |
| 3,385,947 | 5/1968 | Inoue | 219/69 M |
| 3,417,006 | 12/1968 | Inoue | 219/69 M |
| 3,459,916 | 8/1969 | Ferguson | 219/69 M |
| 3,461,056 | 8/1969 | Maeda et al. | 219/69 M |
| 3,558,998 | 1/1971 | Bentolasi | 219/69 C |
| 3,596,038 | 7/1971 | Hockenberry et al. | 219/69 P |
| 3,723,690 | 3/1973 | Nakada et al. | 219/69 M |

Primary Examiner—Thomas J. Kozma
Assistant Examiner—Clifford C. Shaw
Attorney, Agent, or Firm—Oblon, Fisher, Spivak, McClelland & Maier

[57] ABSTRACT

A method and apparatus for electrical discharge machining are disclosed. The method includes the use of a bipolar pulsating voltage to improve the quality of a discharge machining operation. The use of an intermittent AC voltage and an intermittent AC voltage with an intermittent DC voltage interposed during the quiescent periods thereof is also disclosed. A water bath for discharge machining is disclosed, as is a novel circuit for producing bipolar pulsating power and a novel apparatus for combining a plurality of such power supplies and insuring that all output power is maintained in the same phase. Electrode shielding and automatic drive methods and apparatus are disclosed as is a novel capacitive electrode coupling technique.

2 Claims, 26 Drawing Figures

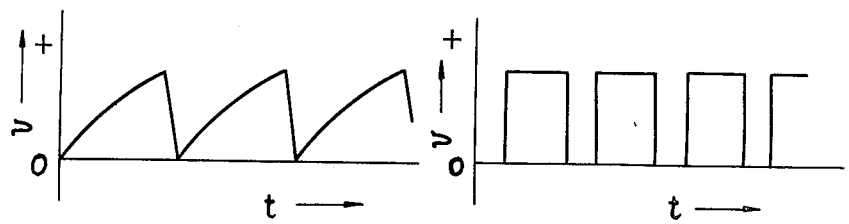
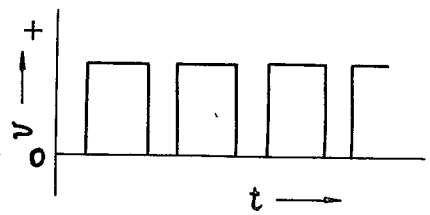
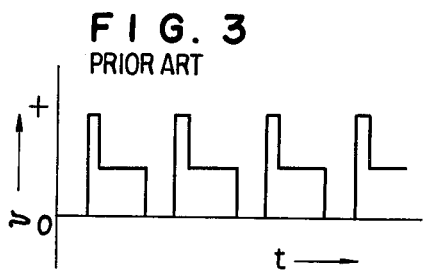
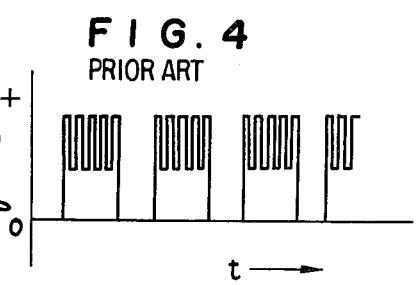
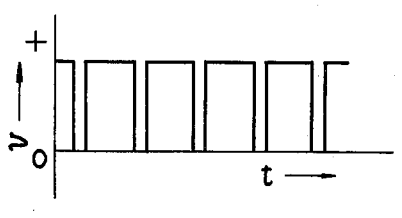
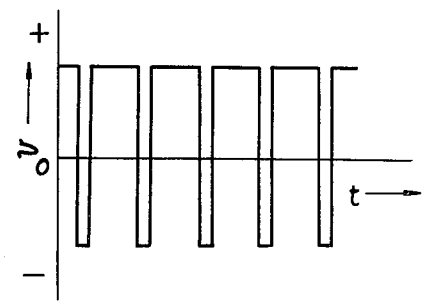
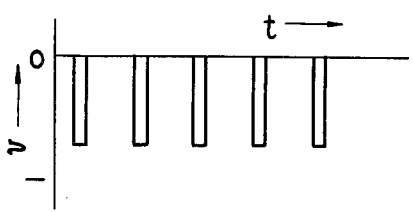

4,211,908

APPARATUS FOR HIGH FREQUENCY DISCHARGE SHAPING OF A WORKPIECE BY MEANS OF A RECTANGULAR BIPOLAR PULSATING VOLTAGE

This is a continuation of application Ser. No. 548,019, filed Feb. 7, 1975, abandoned.

BACKGROUND OF THE INVENTION

1. Field of the Invention:

The present invention relates to a process and apparatus for high frequency AC discharge shaping and more particularly to a novel process and apparatus for high frequency AC discharge shaping with improved efficiency and surface treating accuracy and a decreased electrode consumption rate.

2. Description of the Prior Art:

It is well-known that a treated surface formed by an electrical discharge shaping operation generally has unevenness somewhat similar to that of a pear, although this disadvantage has been tolerated as a practical matter. For example, in the treatment of a super hard alloy, discharge shaping operations have been performed as a primary treatment and the treated workpiece has been further polished to a mirror finish to remove the surface unevenness caused by the discharge shaping operation. With this polishing treatment, however, it is disadvantageously necessary to spend considerable time and labour in the polishing operation. Other disadvantages of discharge shaping apparatus are the difficulty in electrode feed control and firing, etc.

The voltage applied for conventional discharge shaping operations has been a saw tooth waveform voltage, as shown in FIG. 1, which is generated by a Rutherenco circuit, or the like. However, now it is customary to apply a pulsed voltage as shown in FIGS. 2-4, which is generated by a transistor circuit. FIG. 2 shows a rectangular waveform pulse voltage. FIG. 3 shows a high voltage overlap rectangular waveform pulse voltage and FIG. 4 shows a comb waveform pulse voltage. The illustrated voltage waveforms are all different, however they are similar in that all are single polarity positive or negative pulsating voltages.

SUMMARY OF THE INVENTION

Accordingly, it is one object of the present invention to provide a process for discharge shaping of a workpiece by applying a bipolar pulse voltage using a transistor circuit to improve the smoothness of the treated surface.

It is another object of the present invention to provide a process for discharge shaping of a workpiece by applying an intermittent high frequency voltage to improve the accuracy in the shape of the treated surface.

It is another object of the present invention to provide a process for discharge shaping of a workpiece by applying an intermittent high frequency voltage and an intermittent DC voltage so that one is applied during the quiescent time of the other.

A still further object of the invention is to provide a process for discharge shaping a workpiece by applying an arc discharge voltage to improve the shaping accuracy of treated surface.

Another object of the invention is to provide a process for discharge shaping a workpiece by applying an arc discharge voltage wherein the voltage between the electrode and the workpiece is used as an input voltage for an automatic electrode feed mechanism.

Another object of the invention is to provide a circuit for generating a double polarity pulse voltage.

Yet another object of the invention is to provide a multi-circuit type process for discharge shaping a workpiece wherein a double polarity or bipolar voltage having the same phase is applied to each of the circuits to improve the efficiency of the discharge shaping apparatus.

Another object of the invention is to provide a circuit for producing a high frequency current having high power from a high frequency current having small power.

Another object of the invention is to improve the efficiency of a discharge shaping apparatus by applying a high frequency AC voltage to an electrode.

Still another object of the invention is to reduce the hazard of fire by using water as a work liquid and by applying a high frequency AC voltage as a work voltage.

A further object of the invention is to prevent radio wave crossfiring of power circuits by electromagnetically shielding a work vessel when working with a high frequency voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 to 4 illustrate waveforms of conventional working voltage pulses;

FIGS. 5 and 6 illustrate waveforms of pulses forming the work pulses according to the present invention;

FIG. 7 shows another waveform of pulse voltage according to the present invention;

BRIEF DESCRIPTION OF THE PREFERRED EMBODIMENTS

Figure 8:
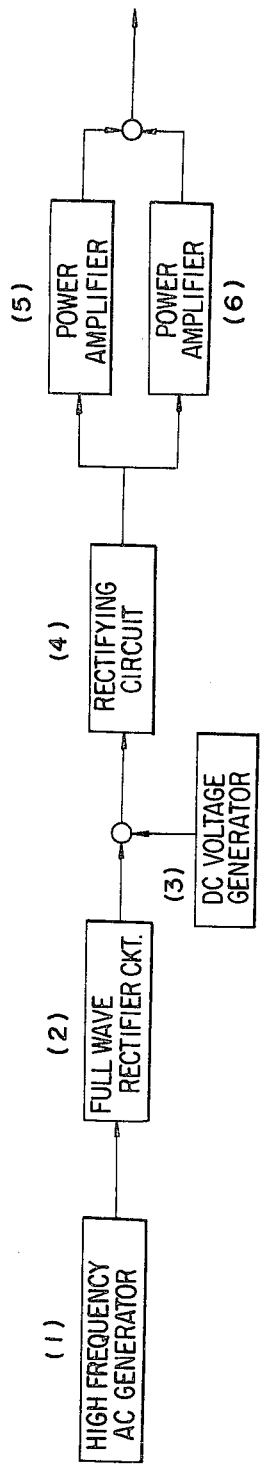
FIG. 8 is a block diagram of a double polarity pulse generating circuit according to the invention.

In the drawings, like reference numerals designate identical or corresponding parts throughout the several views.

In the invention, a single polarity pulse voltage having a high power results from applying the voltage having the waveform of FIG. 5, and simultaneously another single polarity pulse voltage having a small power which has the waveform of FIG. 6 having opposite polarity to the voltage of FIG. 5. Both of the voltages are combined to result in the pulsating voltage which has the waveform of FIG. 7 having a double polarity. This voltage is applied between the machining electrode and the workpiece for performing the discharge shaping operation in a kerosine bath, providing excellent results.

Comparative tests of conventional discharge shaping by applying a voltage having the waveform of FIG. 3 and discharge shaping by applying the voltage illustrated in FIG. 7 have been carried out. The results show that when surface unevenness of the workpiece is in the range from several tens of microns to several microns, the work-speed using the invention is from about 1.5 to more than 10 times faster than that of the conventional process. In discharge shaping using the invention, when the frequency of the pulsating voltage of FIG. 7 is about 1 MHz, a smooth treated surface having an unevenness of about one micron has resulted. It has been extremely difficult to obtain such smoothness using conventional discharge shaping systems.

The inventor has developed a relatively simple transistor circuit for generating the voltage waveform used with the present invention. The block diagram of this power circuit is shown in FIG. 8, with further details of one embodiment of the circuit thereof shown in FIG. 9.

Figure 9:
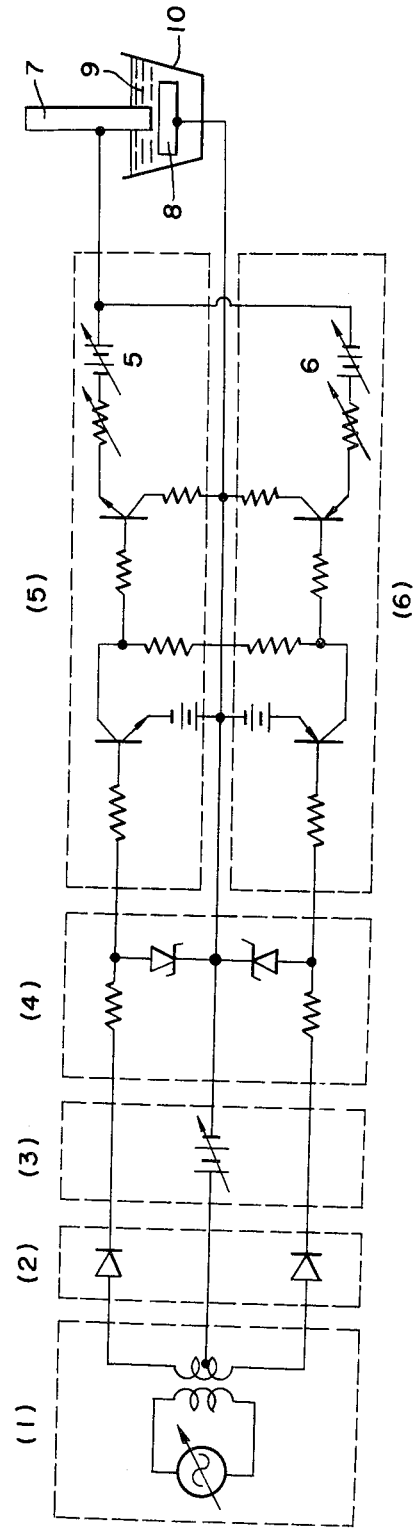
FIG. 9 is a circuit diagram for forming the pulse waveform of FIG. 7.
Figure 10:
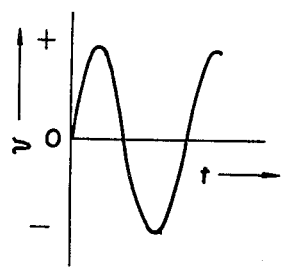
FIGS. 10-15 illustrate output waveforms at various points in the circuits of FIGS. 8 and 9.
Figure 11:
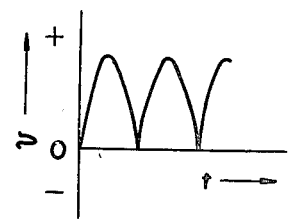
Figure 12:
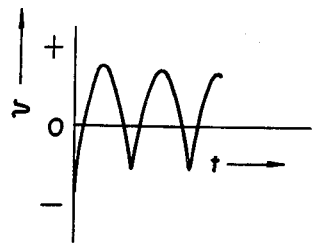
Figure 13:
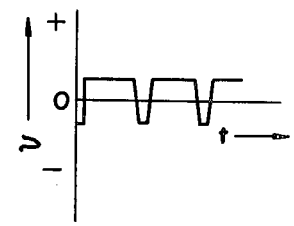
Figure 14:
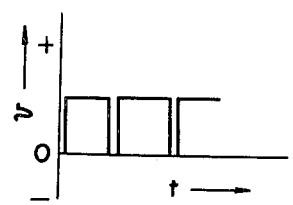
Figure 15:
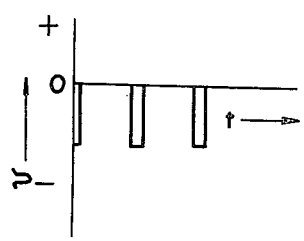

In FIGS. 8 and 9, the element 1 is a high frequency AC voltage generator and the output voltage waveform of which is shown in FIG. 10. The element 2 is a full wave rectifier circuit. When the output voltage of the element 1 is passed through the element 2 the waveform is converted to the waveform of FIG. 11. The element 3 is a DC voltage generator. When the DC voltage of the element 3 is combined with the voltage illustrated in FIG. 11, the single polarity pulsating voltage is converted to a double polarity (i.e. bipolar) pulsating voltage as shown in FIG. 12. The double polarity pulsating voltage is applied to a rectifying circuit 4, resulting in a rectangular bipolar waveform as shown in FIG. 13. Power amplification of this pulse voltage is carried out in a positive polarity pulse voltage amplifying circuit 5 and in a negative polarity pulse voltage amplifying circuit 6. The output voltage waveforms of the elements 5 and 6 are respectively shown in FIGS. 14 and 15. When the voltages of FIGS. 14 and 15 are applied in parallel, a voltage having the waveform of FIG. 7 results.

Referring now to FIG. 9, the reference numeral 7 designates an electrode for discharge shaping, 8 designates a workpiece, 9 designates a work liquid and 10 designates a work vessel. In discharge shaping using the double polarity pulse voltage, it is necessary to change the frequency of the pulse voltage depending upon whether rough processing or fine processing is desired. In accordance with the circuit of the invention, the selection of rough or fine processing is easily attained by changing the frequency of the high frequency AC oscillator element 1 of FIG. 9. In performing the process of the invention, it is necessary to separately change the voltage and current of the positive polarity voltage pulse and the voltage and current of the negative polarity voltage pulse depending upon the desired operating conditions. This selection is easily accomplished by controlling the DC power of the elements 5 and 6 in the circuit of FIG. 9.

In accordance with another aspect of the invention, a power circuit is provided for a discharge shaping apparatus which is quite effective for imparting the characteristics of AC arc discharge shaping using a double polarity pulse voltage. In high frequency AC arc discharge shaping it is necessary to use a high frequency oscillator having a frequency of 10 MHz and a high frequency power output of about 5 KW. There are no commercial high frequency oscillators using transistor circuitry which satisfy these characteristics. When a plurality of transistors are connected in parallel, the frequency of the combined circuit is disadvantageously decreased even though high power is attained. In accordance with the invention, however, a plurality of transistors may be operated in parallel and yet provide both high frequency and large power output.

Figure 16:
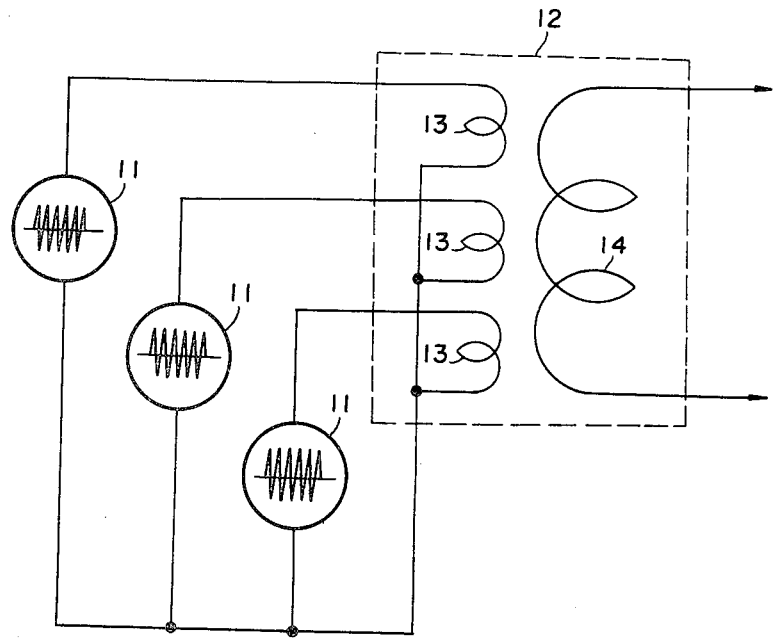
FIG. 16 is a schematic view showing the principle of the invention.

The circuit of the invention which achieves these desirable properties is shown in FIG. 16 wherein reference numerals 11 designate transistor oscillating circuits of the type shown in FIGS. 8 and 9, each having the same phase output high frequency current and 12 designates a high frequency power combining coil where high frequency currents from the transistor oscillating circuits 11 are applied to a primary coil 13. High frequency power current is provided at the terminals of the secondary coil 14 of the high frequency power combining coil 12.

Figure 17:
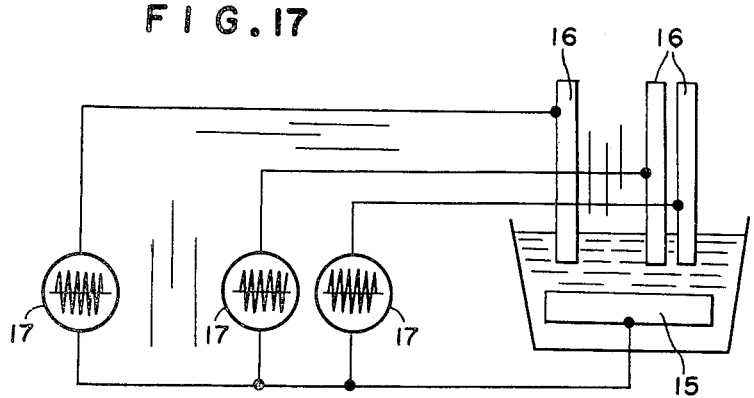
FIG. 17 is a schematic view of an apparatus based on the principle of FIG. 16.

In another embodiment of the invention, high speed discharge shaping is attained by feeding power from a plurality of separate power sources to the machining electrode. This system is referred to as multi-power source system. When the disclosed double polarity arc discharge shaping operation is applied to a multi-power source system as shown in FIG. 17, the following disadvantage is caused if the phases of the voltages of the plural power circuits are not the same. Specifically, the case in which the high frequency AC voltage of FIG. 7 is applied as the double polarity voltage will be discussed.

When the phase of one power source in the combined power sources 17 is inverted relative to the phase of another power source, twice the working voltage [voltage between the electrode 16 and the workpiece 15] exists between the electrodes coupled to these two power sources and accordingly a discharge between these electrodes results, rather than between the electrodes and the workpiece. Even though the phase of one circuit is not completely inverted, if there is a phase difference, a high frequency voltage is applied between the electrodes, and accordingly high frequency induced heating disadvantageously occurs in the work solution between the insulators holding the electrodes. These disadvantages also occur where a double polarity pulse voltage is used as the work voltage.

Figure 18:
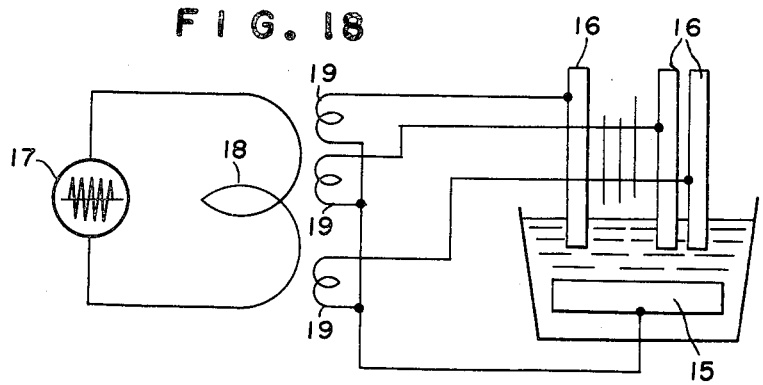
FIG. 18 is a circuit diagram of the invention.

However, in accordance with another aspect of the invention, as shown in FIG. 18, a plurality of secondary coils 19 are combined with one primary coil 18 and are connected to the electrodes, respectively, whereby all high frequency voltages of the electrodes have exactly the same phase and no voltage difference exists between the electrodes. Accordingly, the above described disadvantages are prevented.

In conventional multi-power source systems, the discharge shaping operation itself uses a single polarity discharge. Accordingly, there is no danger of applying two times of the work voltage between the electrodes. However, when the double polarity arc discharge shaping operation is used with a multi-power source system, the above-mentioned disadvantage becomes a factor. This disadvantage is easily overcome by applying voltages having the same phase to the circuits, in accordance with the aspect of the invention described above.

Figure 19:
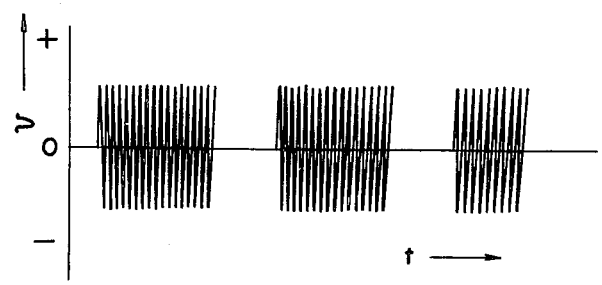
FIG. 19 shows a waveform of an intermittent high frequency voltage.

In discharge shaping operations using the high frequency double polarity pulse voltage, if the workpiece area is small, disadvantageous phenomena, such as tortoise shell like cracks, occur on the surface of the workpiece when super hard alloys are used. Annealing is caused in the case of using a workpiece made of quenched steel, and quenching is caused when mild steel is used. The present inventor has found that such disadvantageous phenomena can be prevented by inserting a chopper circuit in the power source to generate an intermittent high frequency output voltage, whereby the intermittent high frequency voltage waveform illustrated in FIG. 19 is applied between the electrode and the workpiece. In this case, the machining speed is slightly decreased, although the above-mentioned disadvantageous phenomena are prevented. In accordance with this embodiment of the invention the following advantages occur relative to the other embodiments.

(1) the phenomena of crack formation and the quenching or annealing of workpieces made of super hard alloy or mild steels is completely prevented, (2) the discharge power may be changed simply by changing the intermittent duty cycle without changing the high frequency voltage, whereby it is quite convenient for use with an electrode automatic feed operation, and a dust or waste discharging operation.

Figure 20:
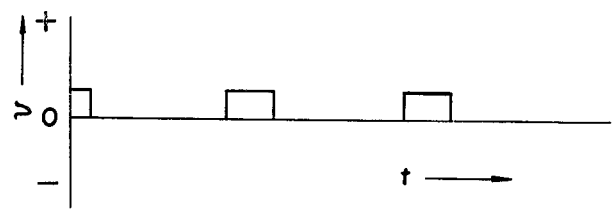
FIG. 20 shows a waveform illustrating the operation of the invention.
Figure 21:
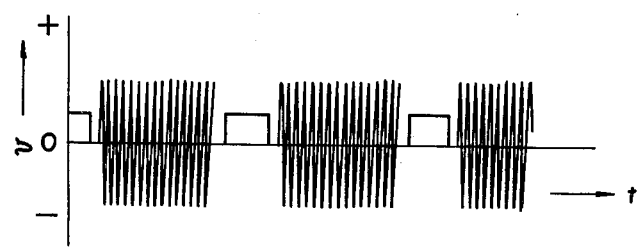
FIG. 21 illustrates the waveform of a special intermittent high frequency voltage according to the invention.

In discharge shaping operation using high frequency AC voltage, electrode consumption is relatively high. The following aspect of the invention permits reduction of the electrode consumption rate. In accordance with this aspect, the intermittent high frequency is generated from a high frequency oscillating power source by a chopper circuit comprising a transistor. An intermittent DC voltage of about 20 volts, as shown in FIG. 20, is also applied during the quiescent period of the intermittent high frequency voltage to form an intermittent voltage having the waveform of FIG. 21. When this combined intermittent voltage is applied between the electrode and the workpiece for the discharge shaping operation, the surface of the electrode is covered with a black material (it may be dust) and the consumption of the electrode is significantly decreased.

Figure 22:
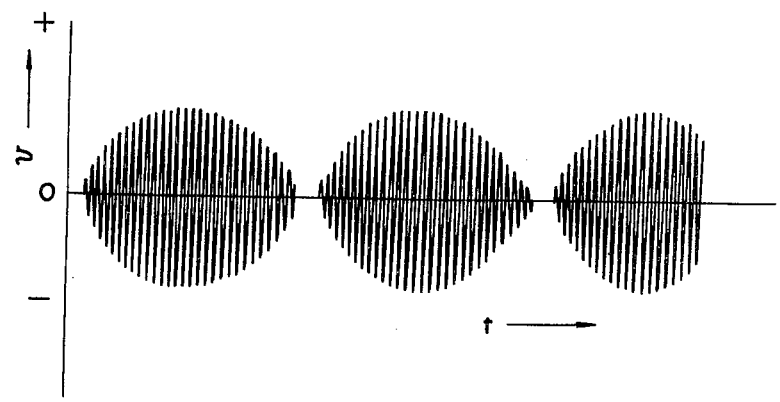
FIG. 22 illustrates the waveform of an arc discharge voltage according to the invention.

An arc discharge shaping system using an AC voltage having the waveform of FIG. 22 will now be described in more detail. The present inventor has also provided an automatic electrode feed system for use with an AC arc discharge shaping system as another aspect of the present invention. In a discharge shaping apparatus it is necessary to maintain a constant work gap during the discharge shaping operation by advancing the electrode depending upon progress of the operation. In accordance with this aspect of the invention, the high frequency oscillator is operated by applying the fullwave rectified voltage derived from a single phase 50 Hz source, resulting in the intermittent high frequency voltage of FIG. 22. This intermittent high frequency voltage is applied across the work gap to perform the discharge shaping operation whereby the peak value of the voltage applied across the work gap is essentially proportional to the width of the work gap in principle.

Figure 23:
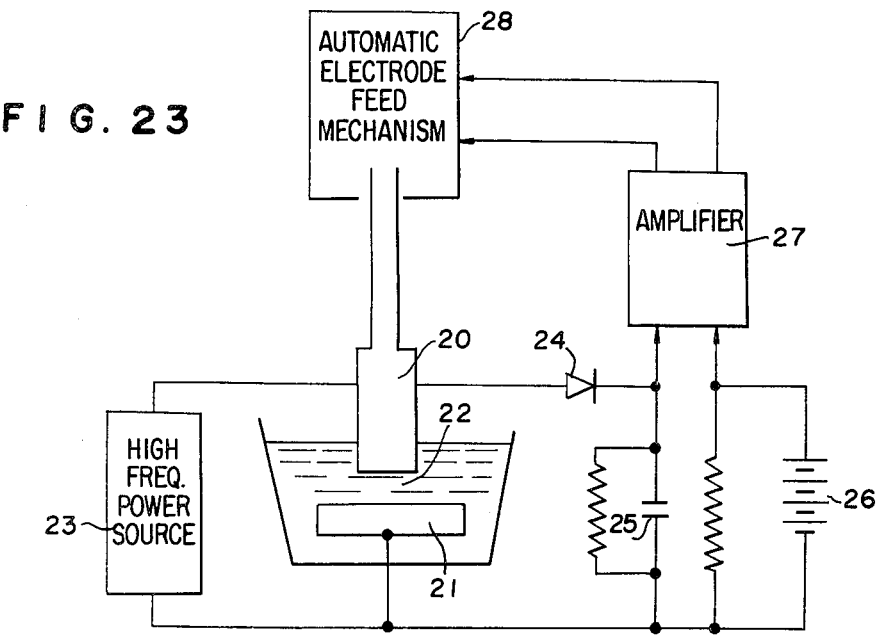
FIG. 23 is a schematic view of an electrode feed apparatus according to the invention.

FIG. 23 is a schematic view of the electrode feed apparatus based on the above-mentioned principle. In the apparatus of FIG. 23, the discharge shaping operation is carried out by applying the voltage of FIG. 22 across a work gap 22 between the electrode 20 and a workpiece 21 from a high frequency power source 23. When a diode 24 and a capacitor 25 are connected to the work gap in the shaping operation, a voltage corresponding to the peak value of voltage across the work gap is accumulated on the capacitor 25. The difference between the voltage of a DC power source 26 and terminal voltage of the capacitor 25 is applied as an input voltage of an amplifier 27 whereby an automatic servo-motor equipped electrode feed mechanism 28 is driven by the output power of the amplifier 27 so as to automatically feed the electrode.

Figure 24:
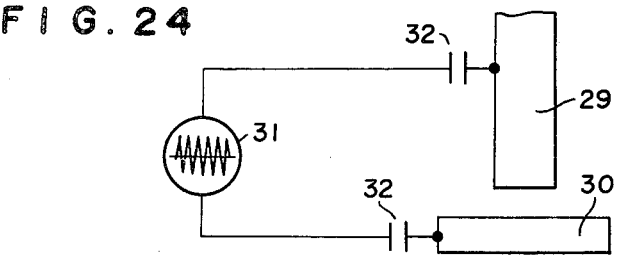
FIG. 24 illustrates a structure showing the principle of the working power supply according to the invention.
Figure 25:
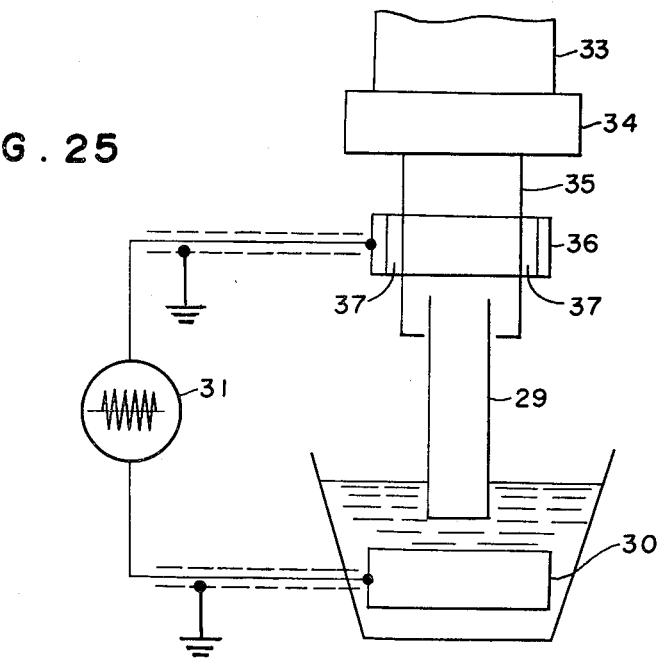
FIG. 25 is a schematic view of an apparatus based on the principle illustrated in FIG. 24.

In conventional discharge shaping apparatuses, the work voltage is fed from the work voltage output terminal of the power source to the electrode in the body of the apparatus by electrically connecting them with a coaxial cable or a feeder circuit or the like. When the electrodes are rotatably mounted in a discharge shaping apparatus, they are electrically connected by mechanically contacting them with an electrical brush. In the above described shaping operation using high frequency voltage, it is not always necessary to mechanically contact the electrodes for applying power to them. In FIG. 24, an electrode 29 is electrically connected to a power source 31 and to a workpiece 30 through capacitors 32 to form a circuit. FIG. 25 is a schematic view of a more practical embodiment of the FIG. 24 apparatus wherein the reference numeral 33 designates an electrode drive shaft, 34 designates a high frequency insulator, 35 designates a holder for electrode 29 and 30 designates a workpiece. The holder 35 is a cylindrical metal structure having an annular ring 36 with a larger diameter fitted as shown in FIG. 25. Power is fed from the power source 31 to the annular ring 36 whereby a gap 37 between the holder 35 and the annular ring 36 imparts electrostatic capacity (and is the equivalent ot capacitor 32 of FIG. 24) so as to feed the power from the power source 31 to the electrode 29. In accordance with this aspect of the invention, the feeder line can be a fixed line and the structure of the apparatus can be simple even though the electrode 29 is rotated or vertically moved.

In conventional discharge shaping apparatuses, the machining work is carried out by arc discharge across the gap in a kerosine bath. Because kerosine is a commercially available insulating liquid having a low viscosity, kerosine is usually used as the work liquid. However, from the viewpoints of low viscosity and availability, water is superior to kerosine, although water causes electrolysis of the electrode metal or the workpiece metal when a pulsating work voltage is used because of its poor insulating properties. Accordingly, water is not normally used as the work liquid. The inventors have found that a suitable discharge shaping operation is attained using water as the work liquid without extensive electrolysis of the electrode metal when a voltage having a frequency in the megahertz range is used in the disclosed discharge shaping operation.

In high frequency AC discharge shaping in water, if the facing area of the electrode and the workpiece is broad, the water work liquid is heated by induction causing boiling and vaporization whereby the operation is obstructed. However, when the facing area of the electrode and workpiece is relatively narrow, as in wire cut type discharge shaping and in discharge tool polishing operations, discharge shaping may be accomplished in a water bath without obstruction. There is a strong possibility of igniting kerosine as it is poured in conventional wire cut discharge shaping and in conventional discharge polishing. In accordance with the present aspect of the invention, however, the danger of fire is completely eliminated.

Figure 26:
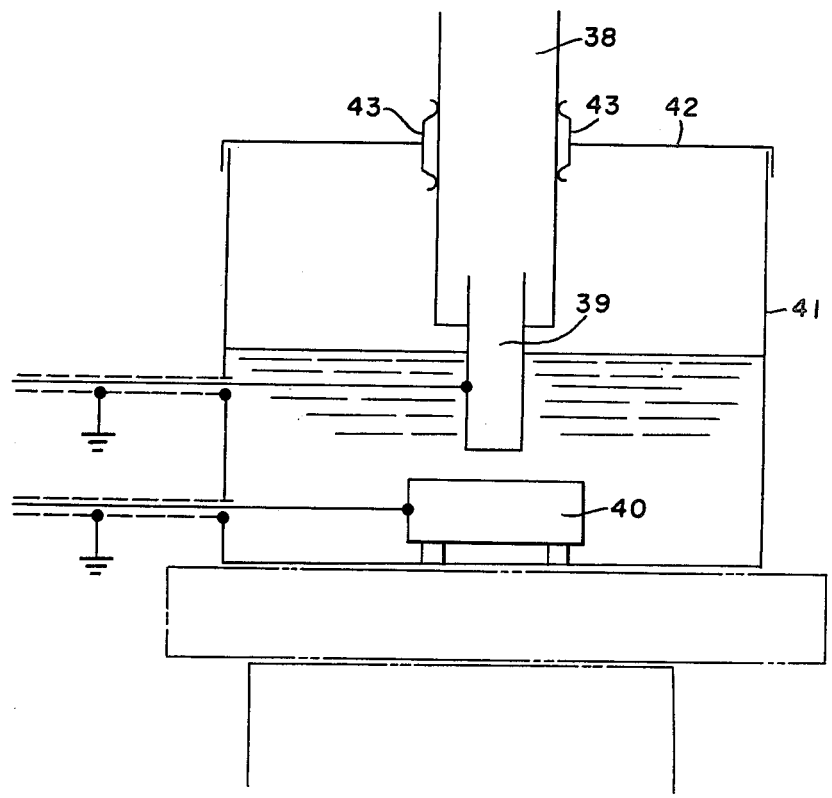
FIG. 26 is a schematic view of a shielded working vessel according to the invention.

In high frequency discharge shaping operation, a "crossfire" wave is radiated from the electrode and the workpiece. Accordingly, it is necessary to provide electromagnetic shielding. FIG. 26 is a schematic view of an embodiment of the invention having a work vessel which is electromagnetically shielded, wherein the reference numeral 38 designates a shield, 39 designates an electrode, 40 designates a workpiece and 41 designates a work vessel. A metallic cover 42 is placed over the metallic vessel 41. The electrode 39 and the shield 38 are inserted through a central aperture in the cover 42. As shown in FIG. 26, the cover 42 is electrically connected to the shield 38 by the electric brush 43. In accordance with the invention, the vessel is electromagnetically closed to completely shield the radiation and prevent crossfire waves.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In a high frequency discharge shaping apparatus, having an electrode and means for spacedly mounting said electrode and a workpiece to form a discharge gap therebetween, a power supply comprising:

a plurality of transformer coil means;

a plurality of sources of rectangular bipolar pulsating current signals wherein the magnitude of the maximum positive voltage is substantially equal to the magnitude of the maximum negative voltage coupled to said plurality of transformer coil means; and a power accumulating coil electromagnetically coupled to said plurality of transformer coil means for accumulating the electrical power thereof and for supplying output power of a single phase across said gap.

2. In a high frequency discharge shaping apparatus having an electrode and means for spacedly mounting said electrode and a workpiece to form a discharge gap therebetween, a power supply including a plurality of transformer coil means, a plurality of sources of rectangular bipolar pulsating current signals, said plurality of sources respectively coupled to said plurality of transformer coil means, and a power accumulating coil electromagnetically coupled to said plurality of transformer coil means for accumulating the electrical power thereof and for supplying output power of a single phase; and a coupling ring positioned around but spaced from said electrode and coupled to said power supply for capacitively supplying power to said electrode.

* * * * *

UNITED STATES PATENT AND TRADEMARK OFFICE
CERTIFICATE OF CORRECTION

PATENT NO. : 4,211,908
DATED : July 8, 1980
INVENTOR(S) : YOSHIEI NIWA

It is certified that error appears in the above-identified patent and that said Letters Patent are hereby corrected as shown below:

-- [30]  Foreign Application Priority Data   should read

| -- Feb. 19, 1974 [JP] | Japan......49-19130 |
| Feb. 19, 1974 [JP] | Japan......49-19131 |
| Feb. 19, 1974 [JP] | Japan......49-19132 |
| Feb. 19, 1974 [JP] | Japan......49-19133 |
| Feb. 19, 1974 [JP] | Japan......49-19134 |
| March 6, 1974 [JP] | Japan......49-25309 |
| March 6, 1974 [JP] | Japan......49-25310 |
| March 6, 1974 [JP] | Japan......49-25311 |
| March 6, 1974 [JP] | Japan......49-25312 |
| March 6, 1974 [JP] | Japan......49-25313 --. |

Signed and Sealed this

Ninth Day of September 1980

[SEAL]

Attest:

SIDNEY A. DIAMOND

Attesting Officer    Commissioner of Patents and Trademarks